Sept. 30, 1930.    W. I. KAVIN    1,777,091
FLOAT CONTROLLED VALVE
Original Filed Sept. 28, 1927
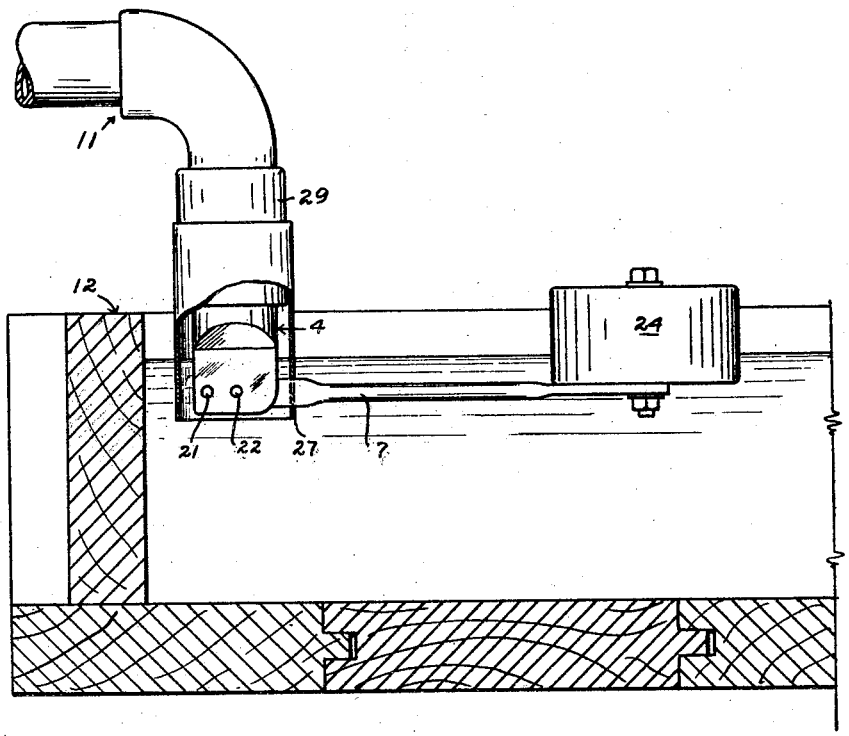
Fig. 1.
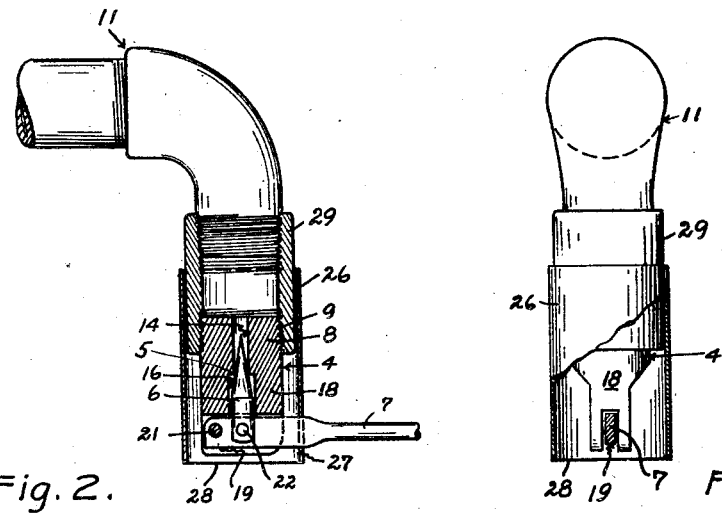
Fig. 2.    Fig. 3.
INVENTOR.
WILLIAM I. KAVIN
BY 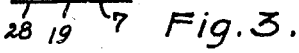
his ATTORNEY Patented Sept. 30, 1930

1,777,091

UNITED STATES PATENT OFFICE

WILLIAM I. KAVIN, OF PETALUMA, CALIFORNIA, ASSIGNOR TO DAVID KLEBANOFF, OF PETALUMA, CALIFORNIA

FLOAT-CONTROLLED VALVE

Application filed September 28, 1927, Serial No. 222,526. Renewed June 30, 1930.

My invention relates to valves designed for use in controlling the supply of liquid to a vessel whereby a desired liquid level may be automatically maintained in the vessel.

An object of the invention is to provide a particularly simple compact valve of the type described.

Another object of the invention is to provide an efficient valve of the type described having no members thereof formed of a resilient material.

A further object of the invention is to provide a valve of the character described which will operate efficiently when immersed in the liquid.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings,

Figure 1 is a fragmentary side sectional view of a vessel showing the valve operatively mounted therein, a portion of the valve structure being broken away.

Figure 2 is a side sectional view of the valve.

Figure 3 is a side view of the valve taken at right angles to the view of Figure 1, and having a portion of the valve structure broken away.

Valves of the class to which the present invention relates find a wide use in out-door situations for the control of the supply of water to watering-troughs and the like. On account of their exposure, the maintenance of such valves in an operative condition has heretofore been found difficult, both on account of the tendency of many of the present valves to stick shut, the fact that resilient washer or plug members found in such valves require frequent renewal, and the exposure of the operative parts of such valves to the atmosphere. In accordance with my invention, however, the occurrence of the foregoing and other difficulties met in the present valves is positively prevented in a particularly compact valve structure formed with a minimum of parts.

Essentially, the valve 3 of my invention comprises a body 4 providing a valve seat 5, a valve plug 6 arranged for operative disposal in said seat, and a float arm 7 carrying said plug and pivoted to said body. As herewith particularly disclosed, the body 4 is of a generally cylindrical form and an end portion 8 thereof is externally threaded as at 9 for connecting the body to a supply pipe 11, which pipe is also utilized for supporting the valve in operative position in a vessel 12. Extending longitudinally through the body 4 is a passage or bore formed with cylindrical and axially related portions 14 and 16 of different diameters, the bore portion 14 being the smaller and extending inwardly from the pipe engaging end of the body to its juncture with the portion 16. The seat 5 is defined at the juncture of the two bore portions, and is here shown in the form of a relatively sharp circular edge.

The valve plug 6, it will now be noted, is arranged to be held in the bore of the body for longitudinal reciprocation therein and is conical, with the diameter at an intermediate portion thereof that of the seat 5. Preferably, and as shown, the apical angle of the plug 6 is acute and is so small that a fine adjustment of the plug with respect to the seat 5 is provided for whereby the action of a needle valve is, in effect, accomplished. Preferably, the unthreaded body portion 18 is of no greater diameter than the threaded body portion 8, and the former portion is provided with a diametral slot 19 extending axially inwardly from its free end in intersecting and parallel relation with the larger bore portion 16. The pivotal mounting of the arm 7 on the body is effected by means of a pivot pin 21 inserted through the body portion 18 to extend transversely of and through the slot and arm in offset relation from the valve bore axis. The plug 6 is slotted at its larger end to receive the arm 7 and is pivotally secured to the arm at such end by means of a pivot pin 22, it being noted that a plane through the pivotal axes of the pins 21 and 22 is arranged to be substantially perpendicular to the bore axis when the plug is seated for closing the bore. Preferably, the arm bearings with the pins 21 and 22 are somewhat loose to insure a centered seating of the plug in the seat.

It will now be noted that the valve of my invention is particularly intended for use with the body portion 8 thereof uppermost and with its bore axis substantially vertical. Since, as hereinbefore indicated, the arm 7 is a float arm, an angular raising thereof about the pivot pin 21 must effect a lifting of the valve into its seat so that the rising of the water level in a tank 12 in which the valve is operatively used will be enabled, through its lifting action on a suitable float 24 provided at the free end of the arm 7, to close the valve when a desired water level is reached and to thereafter control the valve for maintaining a desired water level in the tank in a well understood manner. In the present case, of course, the relation of the pivot pins 21 and 22 to the arm is such that the arm functions as a lever of the second class, it being clear, however, that if the valve were to be used in inverted position, the arm would necessarily be arranged to function as a lever of the first class. In either event, the valve plug is preferably arranged to be moved in the direction of flow of the water through the bore whereby closing of the valve is effected against the water pressure and the valve thus tends to stay open rather than closed.

Means are preferably provided for confining the discharge of water from the valve to a downward direction, it being noted that part of a stream of water flowing through the valve bore and around the valve plug 6 will strike the arm 7 where it crosses said passage and so be diverted laterally along the arm through the slot 19 and horizontally from the valve, such effect being particularly marked when a discharge of water having a high pressure head is effected. The desired control of the stream discharged from the valve is here shown effected by means of a sleeve member 26 enclosing and longitudinally movable along the valve body and perforated as at 27 for the reception of the arm whereby the arm supports it in place and variably disposes it in accordance with the disposition of the arm, the contact of the arm with the upper edge of perforation 27 functioning at all times to provide a seal against the escape of water along the top of the arm. If desired, the perforation 27 may be formed as a slot extending axially inwardly from the lower edge 28 of the sleeve, which edge is preferably arranged to at all times lie somewhat below the bottom of the valve body.

Preferably, and as shown, the body portion 18 is cut away at opposite sides thereof to minimize the weight of, and amount of material in the valve body, and in this event the upper end of the sleeve 26 is arranged to maintain a sliding engagement with the outer surface of a cylindrical coupling member 29 operatively interposed between the valve body 4 and the supply pipe 11 whereby the sleeve will be limited to an axial movement with respect to the valve body.

With the valve formed and operatively installed as shown, and the flow of liquid therethrough and therefrom vertically downward, rubbish or dirt may not collect thereon in a manner to prevent the opening of the valve, no springs are necessary in the structure for insuring the valve opening or seating, and the need for the resilient washers or plugs heretofore used in such valves is eliminated. Then too, the entire valve structure may, as shown, be immersed in the liquid whereby the delivery of water therefrom will be rendered inaudible and the depositing of rubbish therein will be prevented. And it will furthermore be noted that the structure provided is particularly compact and simple and, being self-adjusting, will require no servicing after the installation thereof.

I claim:

1. In a valve of the class described, an integral and generally cylindrical body member having a vertically disposed passage for fluid therethrough providing a seat for a valve plug, a valve plug disposed in said passage for engagement in said seat, means at an end portion of said body for securing the same to a supply conduit with said passage registering with the passage of the conduit, and a float arm carrying said plug and pivoted at an end thereof within the lower portion of said body to extend transversely thereacross and therefrom when said valve plug is engaged in said seat.

2. In a valve of the class described, an integral and generally cylindrical body member arranged to be disposed in a tank for liquids below the normal liquid level therein with its axis substantially vertical and having a passage extending longitudinally therethrough, portions of said passage being of different size whereby a generally downwardly directed valve seat is provided at the junction of said passage portions, a tapered valve plug of non-resilient material having an acute apical angle and movable longitudinally upwardly against said seat, means at the upper end portion of said body for securing the same to a supply conduit with said passage registering with the passage of the conduit, a float arm pivotally carrying said plug and pivoted to an end thereof within the lower portion of said body to extend generally transversely thereacross and therefrom when said valve plug is operatively disposed, said valve plug being arranged to be disposed in said seat to close said passage when the liquid is at its normal level in the tank.

3. In a valve of the class described, a vertically disposed cylindrical body member having a passage for a fluid therethrough providing a seat for a valve, a valve plug in said passage arranged to be variably disposed therein with respect to said seat, a float arm pivoted to said body and carrying said plug, and a sleeve member enclosing said body for movement axially therealong and supported by said arm, said sleeve member extending below said arm.

In testimony whereof, I have hereunto set my hand at Oakland, California, this 17th day of September, 1927.

WILLIAM I. KAVIN.